(12) United States Patent
Sasaki

(10) Patent No.: US 6,490,126 B1
(45) Date of Patent: Dec. 3, 2002

(54) THIN-FILM MAGNETIC HEAD HAVING A MAGNETIC LAYER INCLUDING STACKED MAGNETIC MATERIAL LAYERS AND A RESISTANCE LAYER AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/532,518

(22) Filed: Mar. 21, 2000

(30) Foreign Application Priority Data

Apr. 8, 1999  (JP) .......................................... 11-101078

(51) Int. Cl.⁷ .............................................. G11B 5/147
(52) U.S. Cl. ...................................................... 360/126
(58) Field of Search .................................. 360/126, 317

(56) References Cited

U.S. PATENT DOCUMENTS

| 5,047,886 A | * | 9/1991 | Toyoda et al. ............... 360/126 |
| 5,373,408 A | * | 12/1994 | Bischoff et al. ............ 360/126 |
| 5,436,781 A | * | 7/1995 | Matono et al. ............. 360/126 |
| 6,259,583 B1 | * | 7/2001 | Fontana, Jr. et al. ........ 360/126 |

FOREIGN PATENT DOCUMENTS

| JP | A-60-35315 | 2/1985 |
| JP | A-6-139521 | 5/1994 |
| JP | A-11-39610 | 2/1999 |

* cited by examiner

Primary Examiner—David Davis
(74) Attorney, Agent, or Firm—Oliff & Berridge PLC

(57) ABSTRACT

The present invention reduces eddy current loss in magnetic layers making up a magnetic path of an induction-type magnetic transducer without preventing the passage of a magnetic flux so as to improve high frequency characteristics. A thin-film magnetic head of the invention comprises a reproducing head and a recording head. The recording head has a bottom pole layer and a top pole layer that include pole portions opposed to each other, a recording gap layer being placed between the pole portions. The recording head further has a thin-film coil located between the top and bottom pole layers, the coil being insulated from the pole layers. The top pole layer is made up of a plurality of stacked magnetic material layers, and resistance layers each placed between neighboring two of the magnetic material layers. The resistance layers are located in a region of a yoke portion except a neighborhood of a portion connecting the yoke portion to one of the pole portion and except a neighborhood of a portion connecting the yoke portion to the bottom pole layer. Each of the resistance layers are divided and located in a plurality of separate regions.

23 Claims, 16 Drawing Sheets

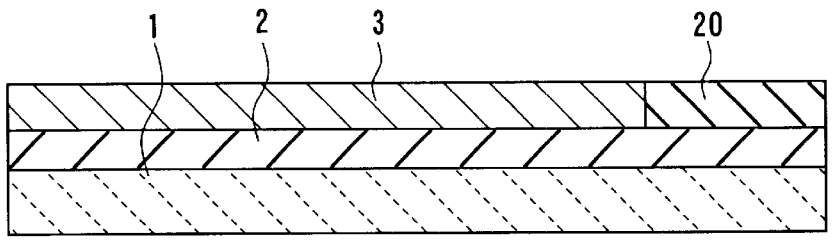 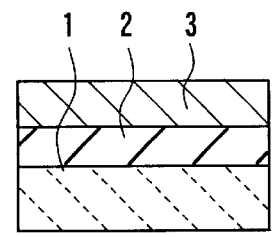
FIG. 1A    FIG. 1B
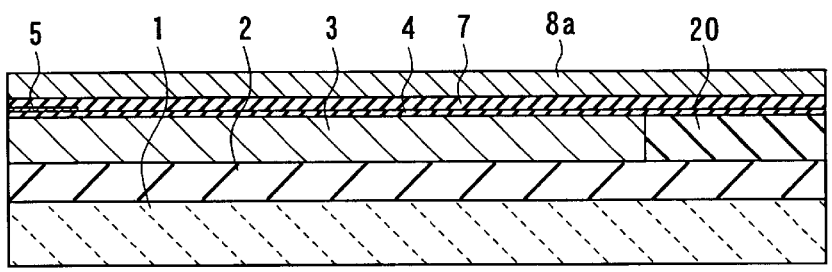 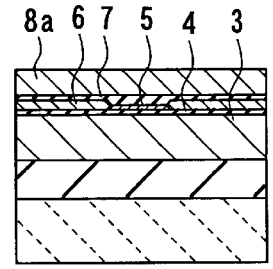
FIG. 2A    FIG. 2B
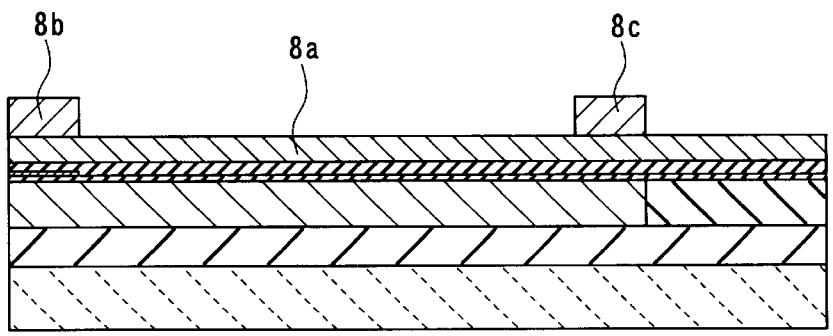 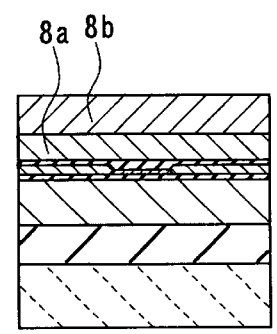
FIG. 3A    FIG. 3B

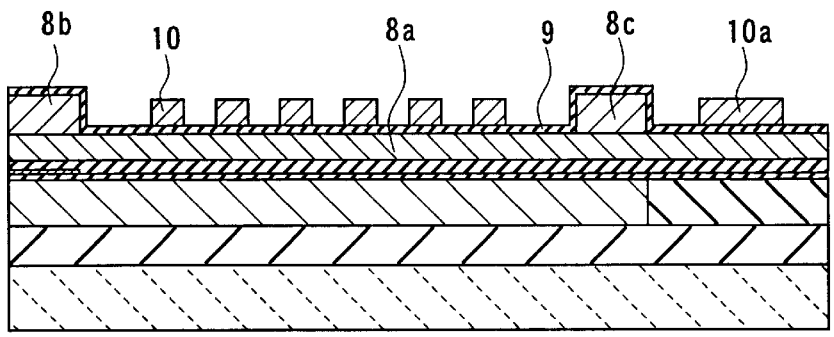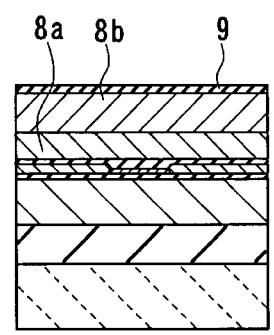
FIG. 4A  FIG. 4B
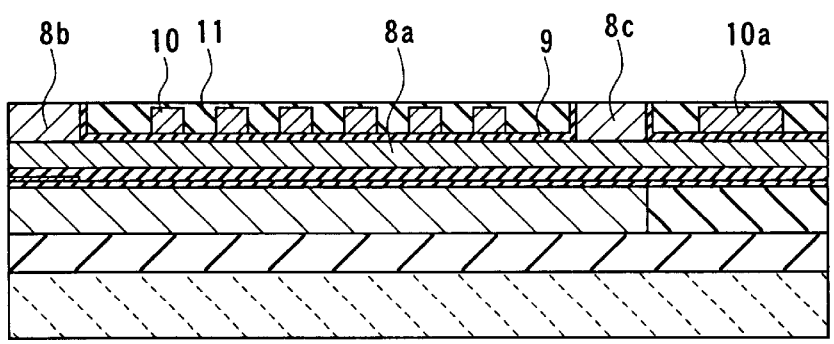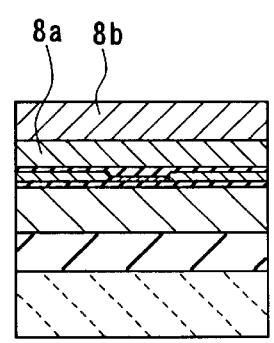
FIG. 5A  FIG. 5B

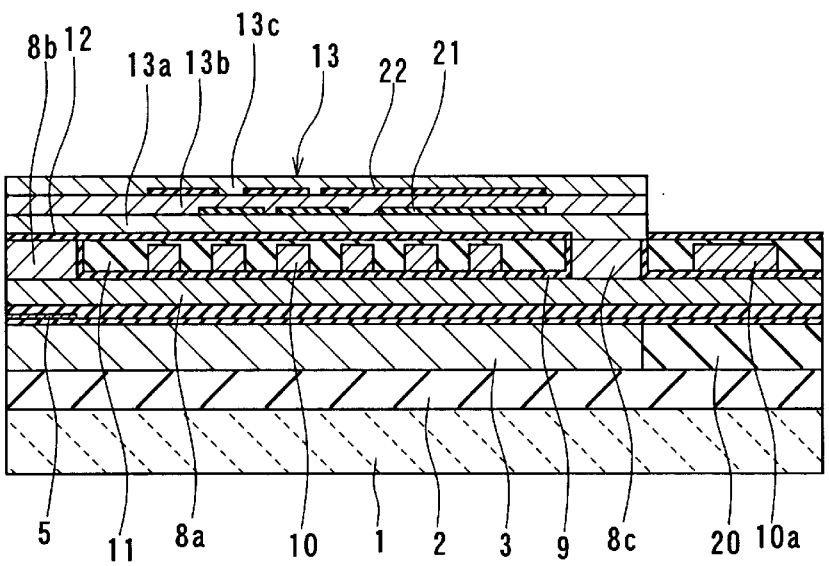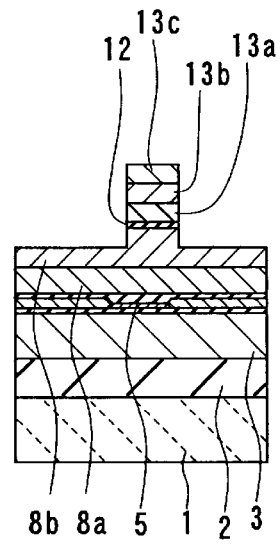
FIG. 6A  FIG. 6B
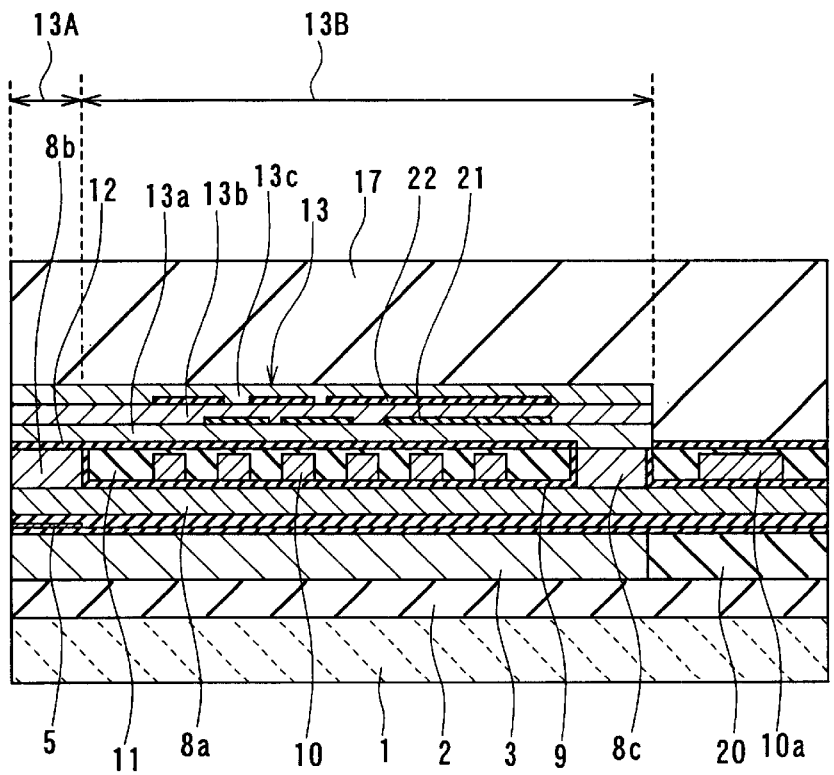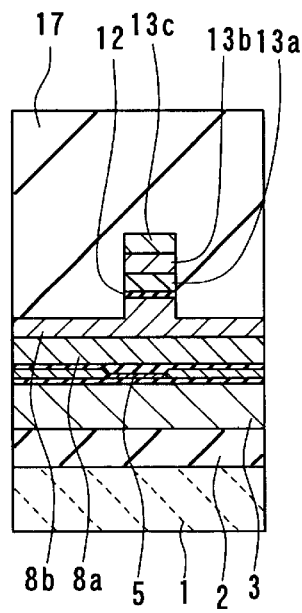
FIG. 7A  FIG. 7B

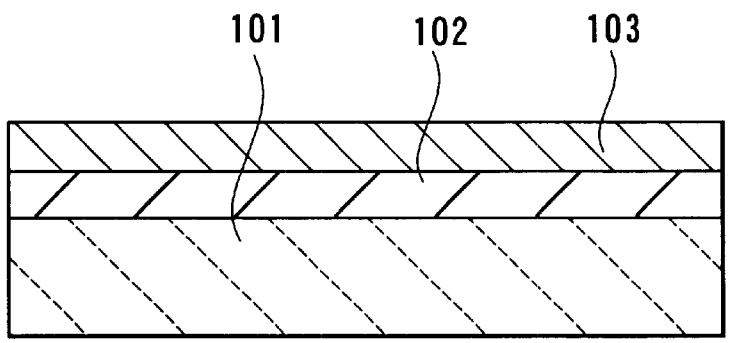
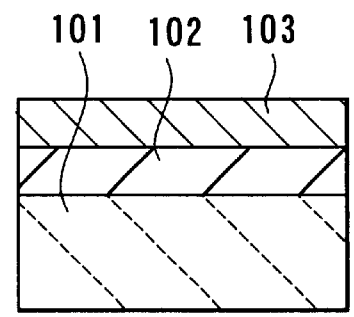
FIG. 16A
RELATED ART
FIG. 16B
RELATED ART
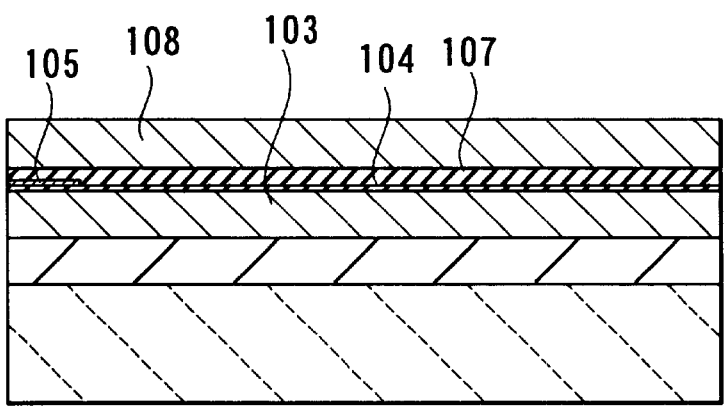
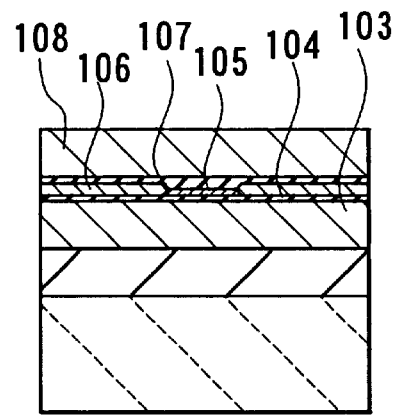
FIG. 17A
RELATED ART
FIG. 17B
RELATED ART

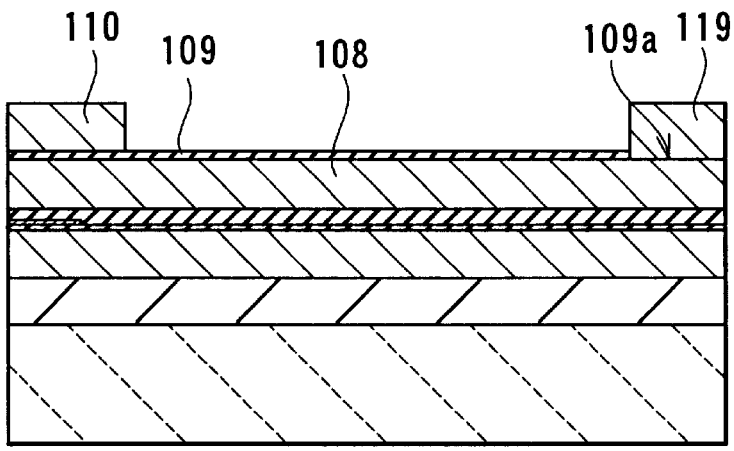
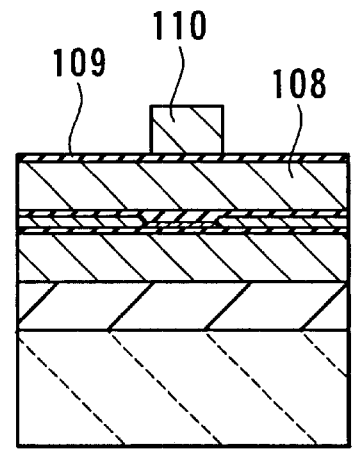
FIG. 18A
RELATED ART
FIG. 18B
RELATED ART
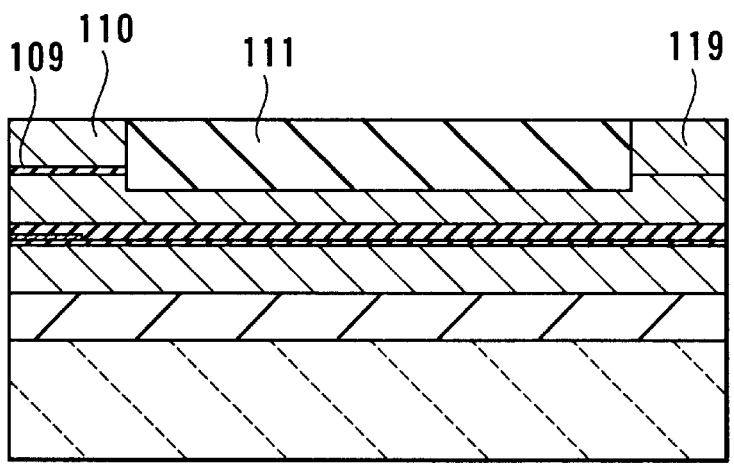
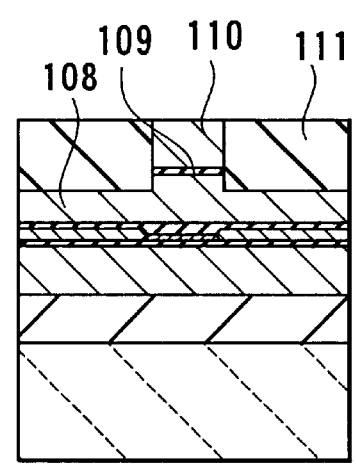
FIG. 19A
RELATED ART
FIG. 19B
RELATED ART

US 6,490,126 B1

THIN-FILM MAGNETIC HEAD HAVING A MAGNETIC LAYER INCLUDING STACKED MAGNETIC MATERIAL LAYERS AND A RESISTANCE LAYER AND METHOD OF MANUFACTURING SAME

BACKGROUND OF THE INVENTION

1. Field of the Invention

The present invention relates to a thin-film magnetic head comprising at least an induction-type magnetic transducer and a method of manufacturing such a thin-film magnetic head.

2. Description of the Related Art

Performance improvements in thin-film magnetic heads have been sought as surface recording density of hard disk drives has increased. Composite thin-film magnetic heads have been widely used. A composite head is made of a layered structure including a recording head having an induction-type magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

The performance of the reproducing head is improved by replacing the AMR film with a GMR film and the like with an excellent magnetoresistive sensitivity. Alternatively, a pattern width such as an MR height, in particular, may be optimized. The MR height is the length (height) between an end of the MR element closer to the air bearing surface and the other end. The MR height is controlled by an amount of lapping when the air bearing surface is processed. The air bearing surface is a surface of the thin-film magnetic head facing toward a magnetic recording medium and may be called a track surface, too.

Performance improvements in a recording head are also required as the performance of a reproducing head is improved. One of the factors that determine the recording head performance is a pattern width such as a throat height (TH), in particular. The throat height is the length (height) of portions of magnetic pole layers facing each other with a recording gap layer in between, between the air-bearing-surface-side end and the other end. A reduction in throat height is desired in order to improve the recording head performance. The throat height is controlled as well by an amount of lapping when the air bearing surface is processed.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to a submicron order. Semiconductor process techniques are utilized to implement such a structure.

As thus described, it is important to fabricate well-balanced recording and reproducing heads to improve the performance of a thin-film magnetic head.

Reference is now made to FIG. 16A to FIG. 21A, FIG. 16B to FIG. 21B, and FIG. 22 to describe an example of a method of manufacturing a composite thin-film magnetic head as an example of a related-art method of manufacturing a thin-film magnetic head. FIG. 16A to FIG. 21A are cross sections each orthogonal to the air bearing surface of the thin-film magnetic head. FIG. 16B to FIG. 21B are cross sections of a pole portion of the head each parallel to the air bearing surface.

In the manufacturing method, as shown in FIG. 16A and FIG. 16B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, as shown in FIG. 17A and FIG. 17B, on the bottom shield layer 103, alumina, for example, is deposited to a thickness of 100 to 200 nm through sputtering to form a bottom shield gap film 104 as an insulating layer. On the bottom shield gap film 104 an MR film having a thickness of tens of nanometers is formed for making an MR element 105 for reproduction. Next, on the MR film a photoresist pattern is selectively formed where the MR element 105 is to be formed. The photoresist pattern is formed into a shape that facilitates lift-off, such as a shape having a T-shaped cross section. Next, with the photoresist pattern as a mask, the MR film is etched through ion milling, for example, to form the MR element 105. The MR element 105 may be either a GMR element or an AMR element. Next, on the bottom shield gap film 104, a pair of electrode layers 106 are formed, using the photoresist pattern as a mask. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 $\mu$m is formed. The bottom pole layer 108 is made of a magnetic material and used for both a reproducing head and a recording head. Next, on the bottom pole layer 108, a recording gap layer 109 made of an insulating film such as an alumina film whose thickness is 0.2 $\mu$m is formed.

Next, as shown in FIG. 18A and FIG. 18B, a portion of the recording gap layer 109 is etched to form a contact hole 119a to make a magnetic path. On the recording gap layer 109 in the pole portion, a top pole tip 110 made of a magnetic material such as Permalloy (NiFe) or FeN as a high saturation flux density material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 19A and FIG. 19B, the recording gap layer 109 and the bottom pole layer 108 are etched through ion milling, using the top pole tip 110 as a mask. As shown in FIG. 19B, the structure is called a trim structure wherein the sidewalls of the top pole (the top pole tip 110), the recording gap layer 109, and part of the bottom pole layer 108 are formed vertically in a self-aligned manner. The trim structure suppresses an increase in the effective track width due to expansion of a magnetic flux generated during writing in a narrow track.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened. The polishing method may be mechanical polishing or chemical mechanical polishing (CMP).

Through this polishing, the surfaces of the top pole tip 110 and the magnetic layer 119 are exposed.

Next, as shown in FIG. 20A and FIG. 20B, on the flattened insulating layer 111, a thin-film coil 112 of a first layer is made of copper (Cu), for example, for the induction-type recording head. Next, a photoresist layer 113 is formed into a specific pattern on the insulating layer 111 and the coil 112. Heat treatment is then performed to flatten the surface of the photoresist layer 113. On the photoresist layer 113, a thin-film coil 114 of a second layer is then formed. Next, a photoresist layer 115 is formed into a specific pattern on the photoresist layer 113 and the coil 114. Heat treatment is then performed to flatten the surface of the photoresist layer 115.

Next, as shown in FIG. 21A and FIG. 21B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the recording head and the reproducing head. The thin-film magnetic head is thus completed. FIG. 22 is a top view of the thin-film magnetic head. The overcoat layer 117 is omitted in FIG. 22.

In FIG. 21A and FIG. 21B, 'TH' indicates the throat height and 'MR-H' indicates the MR height. 'P2W' indicates the pole width, that is, the recording track width. In addition to the throat height, the MR height and so on, the apex angle as indicated with θ in FIG. 21A is one of the factors that determine the performance of a thin-film magnetic head. The apex is a hill-like raised portion of the coils covered with the photoresist layers 113 and 115. The apex angle is the angle formed between the top surface of the insulating layer 111 and the straight line drawn through the edges of the pole-side lateral walls of the apex.

With an increase in recording density of a hard disk drive used for computers and so on, the maximum frequency of data recorded or reproduced through the use of a thin-film magnetic head has increased. If the frequency of data to write increases, eddy current loss increases in the magnetic layers of an induction-type magnetic transducer. Accordingly, the following problems have arisen: a reduction in intensity of a write magnetic field generated from the pole portions opposed to each other with the gap layer in between; an increase in delay between a write current (a current responsive to data to write) supplied to the coil and generation of a write magnetic field; and a decrease in gradient of rise of a write magnetic field with respect to time. Those problems specifically manifest themselves in an increase in nonlinear transition shift (NLTS), for example.

In Published Unexamined Japanese Patent Application Hei 6-139521 (1994) and in Published Unexamined Japanese Patent Application Sho 60-35315 (1994), for example, related-art techniques to reduce eddy current loss in the magnetic layers and improve high frequency characteristics of the thin-film magnetic head are disclosed. In those techniques the magnetic layers making up the magnetic path of the induction-type magnetic transducer are made of alternating layers of soft-magnetic layers and insulating layers.

However, since the entire magnetic layers have such a layered structure in those techniques, the region through which a magnetic flux passes is narrow and the flux is prevented from passing. The amount of flux passing through the magnetic layers is thereby reduced.

Another technique disclosed in Published Unexamined Japanese Patent Application Hei 6-139521 provides a structure in which the magnetic layers making up the magnetic path of the induction-type magnetic transducer are made of alternating layers of soft-magnetic layers and insulating layers aligned along the direction orthogonal to the recording gap layer.

However, such a structure of the magnetic layers makes it difficult to maintain the direction of magnetization (magnetostriction) of the magnetic layers. It is therefore difficult to allow a magnetic flux to pass efficiently.

OBJECT AND SUMMARY OF THE INVENTION

It is an object of the invention to provide a thin-film magnetic head and a method of manufacturing the same for reducing eddy current loss in magnetic layers making up a magnetic path of an induction-type magnetic transducer without preventing passage of a magnetic flux so as to improve high frequency characteristics.

A first thin-film magnetic head of the invention comprises: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. Each of the first and second magnetic layers includes: a yoke portion connected to one of the pole portions and located in a region including a region that faces the coil. The yoke portion of at least one of the magnetic layers includes: a plurality of magnetic material layers; and a resistance layer located between adjacent two of the magnetic material layers and having an electric resistance greater than an electric resistance of the magnetic material layers. The resistance layer is located in a region of the yoke portion except a neighborhood of a portion connecting the yoke portion to one of the pole portion and except a neighborhood of a portion connecting the yoke portion to the other magnetic layer.

A first method of the invention is provided for manufacturing a thin-film magnetic head comprising: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. Each of the first and second magnetic layers includes: a yoke portion connected to one of the pole portions and located in a region including a region that faces the coil. The method includes the steps of: forming the first magnetic layer; forming the gap layer on the first magnetic layer; forming the second magnetic layer on the gap layer; and forming the coil such that the at least part of the coil is placed between the first and second magnetic layers. In at least one of the steps of forming the first magnetic layer and forming the second magnetic layer, the yoke portion is formed to include: a plurality of magnetic material layers; and a resistance layer located between adjacent two of the magnetic material layers and having an electric resistance greater than an electric resistance of the magnetic material layers. The resistance layer is located in a region of the yoke portion except a neighborhood of a portion connecting the yoke portion to one of the pole portion and except a neighborhood of a portion connecting the yoke portion to the other magnetic layer.

According to the first thin-film magnetic head or the method of manufacturing the same of the invention, the yoke portion of at least one of the magnetic layers includes the plurality of magnetic material layers and the resistance layer. The resistance layer is located in a region of the yoke portion except a neighborhood of the portion connecting the yoke portion to the pole portion and except a neighborhood of the portion connecting the yoke portion to the other magnetic layer. As a result, it is possible to reduce eddy current loss in the magnetic layers without preventing the passage of a magnetic flux.

According to the first thin-film magnetic head or the method of manufacturing the same of the invention, the resistance layer may be divided and located in a plurality of separate regions.

According to the first head or method, the resistance layer may be made of an insulating material. In this case, the insulating material may be an inorganic material. According to the first method, the resistance layer may be formed into a specific pattern by selectively etching a layer of the inorganic material through reactive ion etching.

According to the first head or method, the first magnetic layer may include: a first portion located in a region including a region that faces the coil; and a second portion forming one of the pole portions and connected to a surface of the first portion that faces the coil. The at least part of the coil is located on a side of the second portion of the first magnetic layer. The yoke portion of the second magnetic layer includes the magnetic material layers and the resistance layer.

According to the first head or method, the head may further comprise: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers. In this case, the second shield layer may function as the first magnetic layer, too.

A second thin-film magnetic head of the invention comprises: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. Each of the first and second magnetic layers includes: a yoke portion connected to one of the pole portions and located in a region including a region that faces the coil. The yoke portion of at least one of the magnetic layers includes: a plurality of magnetic material layers; and a resistance layer located between adjacent two of the magnetic material layers and having an electric resistance greater than an electric resistance of the magnetic material layers. The resistance layer is divided and located in a plurality of separate regions.

A second method of the invention is provided for manufacturing a thin-film magnetic head comprising: a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. Each of the first and second magnetic layers includes: a yoke portion connected to one of the pole portions and located in a region including a region that faces the coil. The method includes the steps of: forming the first magnetic layer; forming the gap layer on the first magnetic layer; forming the second magnetic layer on the gap layer; and forming the coil such that the at least part of the coil is placed between the first and second magnetic layers. In at least one of the steps of forming the first magnetic layer and forming the second magnetic layer, the yoke portion is formed to include: a plurality of magnetic material layers; and a resistance layer located between adjacent two of the magnetic material layers and having an electric resistance greater than an electric resistance of the magnetic material layers; and the resistance layer is divided and located in a plurality of separate regions.

According to the second thin-film magnetic head or the method of manufacturing the same of the invention, the yoke portion of at least one of the magnetic layers includes the plurality of magnetic material layers and the resistance layer. The resistance layer is divided and located in a plurality of separate regions. As a result, it is possible to reduce eddy current loss in the magnetic layers without preventing the passage of a magnetic flux.

According to the second head or method, the resistance layer may be made of an insulating material. In this case, the insulating material may be an inorganic material. According to the second method, the resistance layer may be formed into a specific pattern by selectively etching a layer of the inorganic material through reactive ion etching.

According to the second head or method, the first magnetic layer may include: a first portion located in a region including a region that faces the coil; and a second portion forming one of the pole portions and connected to a surface of the first portion that faces the coil. The at least part of the coil is located on a side of the second portion of the first magnetic layer. The yoke portion of the second magnetic layer includes the magnetic material layers and the resistance layer.

According to the second head or method, the head may further comprise: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers. In this case, the second shield layer may function as the first magnetic layer, too.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 5A and FIG. 5B are cross sections for illustrating a step that follows FIG. 4A and FIG. 4B.

FIG. 6A and FIG. 6B are cross sections for illustrating a step that follows FIG. 5A and FIG. 5B.

FIG. 7A and FIG. 7B are cross sections for illustrating a step that follows FIG. 6A and FIG. 6B.

FIG. 16A and FIG. 16B are cross sections for illustrating a step in a method of manufacturing a thin-film magnetic head of related art.

FIG. 17A and FIG. 17B are cross sections for illustrating a step that follows FIG. 16A and FIG. 16B.

FIG. 18A and FIG. 18B are cross sections for illustrating a step that follows FIG. 17A and FIG. 17B.

FIG. 19A and FIG. 19B are cross sections for illustrating a step that follows FIG. 18A and FIG. 18B.

FIG. 20A and FIG. 20B are cross sections for illustrating a step that follows FIG. 19A and FIG. 19B.

DETAILED DESCRIPTION OF THE PREFERRED EMBODIMENTS

Figure 8:
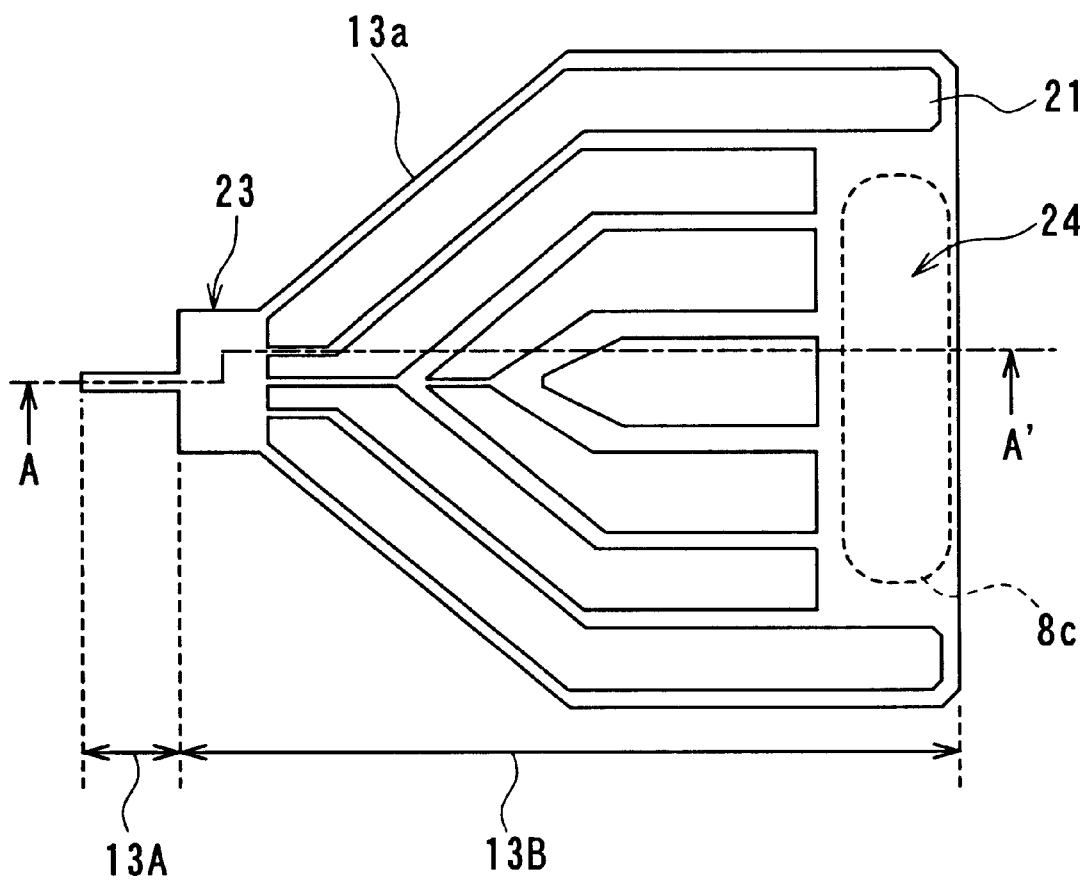
FIG. 8 is a top view of a first magnetic material layer and a first resistance layer of a top pole layer of the thin-film magnetic head of the first embodiment.

Preferred embodiments of the invention will now be described in detail with reference to the accompanying drawings.

[First Embodiment]

Reference is now made to FIG. 1A to FIG. 7A, FIG. 1B to FIG. 7B, and FIG. 8 to FIG. 12 to describe a thin-film magnetic head and a method of manufacturing the same of a first embodiment of the invention. FIG. 1A to FIG. 7A are cross sections each orthogonal to an air bearing surface. FIG. 1B to FIG. 7B are cross sections each parallel to the air bearing surface of the pole portion.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, an insulating layer 20 of alumina, for example, having a thickness of 4 to 6 $\mu$m, for example, is formed over the entire surface. This insulating layer is polished through CMP, for example, so that the bottom shield layer 3 is exposed and the surface is flattened.

Next, as shown in FIG. 2A and FIG. 2B, on the bottom shield layer 3, alumina or aluminum nitride, for example, is deposited through sputtering to form a bottom shield gap film 4 as an insulating layer. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 is formed as an insulating film on the bottom shield gap film 4 and the MR element 5. The MR element 5 is embedded in the shield gap films 4 and 7.

Next, on the top shield gap film 7, a first portion 8a of a top-shield layer-cum-bottom-pole-layer (called a bottom pole layer in the following description) having a thickness of about 1.0 to 2.0 $\mu$m is selectively formed. The bottom pole layer is made of a magnetic material and used for both a reproducing head and a recording head. The first portion 8a is a potion of the bottom pole layer that is placed in a region including a region facing a thin-film coil described later.

Next, as shown in FIGS. 3A and 3B, a second portion 8b and a third portion 8c of the bottom pole layer, each having a thickness of about 1.5 to 2.5 $\mu$m, are formed on the first portion 8a. The second portion 8b makes up a pole portion of the bottom pole layer and is connected to a surface of the first portion 8a on which the thin-film coil is to be formed. The third portion 8c is provided for connecting the first portion 8a to a top pole layer described later. In this embodiment the zero throat height position is defined by the position of an end of the second portion 8b opposite to the air bearing surface (that is, the right side of FIG. 3A). The zero throat height position is the position of an end of the pole portion opposite to the air bearing surface.

The second portion 8b and the third portion 8c of the bottom pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, as shown in FIGS. 4A and 4B, an insulating film 9 of alumina, for example, is formed over the entire surface. The thickness of the insulating film 9 is about 0.3 to 0.6 $\mu$m.

Next, a thin-film coil 10 made of copper (Cu), for example, is formed by frame plating. For example, the thickness of the coil 10 is about 1.0 to 2.0 $\mu$m. Numeral 10a in the drawings indicates a portion to which a conductive layer is connected. The conductive layer is provided for connecting the coil 10 to pads for electrodes described later.

Next, as shown in FIG. 5A and FIG. 5B, an insulating layer 11 of alumina, for example, having a thickness of about 3 to 4 $\mu$m is formed over the entire surface. The insulating layer 11 is then polished through CMP, for example, until the second portion 8b and the third portion 8c of the bottom pole layer are exposed, and the surface is flattened. Although the coil 10 is not exposed in FIG. 5A and FIG. 5B, the coil 10 may be exposed. If the coil 10 is exposed, the other insulating layer is formed on the coil 10 and the insulating layer 11.

Next, as shown in FIG. 6A and FIG. 6B, a recording gap layer 12 made of an insulating material whose thickness is 0.2 to 0.3 $\mu$m, for example, is formed on the second portion 8b and the third portion 8c of the bottom pole layer and the insulating layer 11 exposed. In general, the insulating material used for the recording gap layer 12 may be alumina, aluminum nitride, a silicon-dioxide-base material, a silicon-nitride-base material, or diamond-like carbon (DLC) and so on.

Next, a portion of the recording gap layer 12 located on the third portion 8c is etched to form a contact hole for making the magnetic path.

Figure 9:
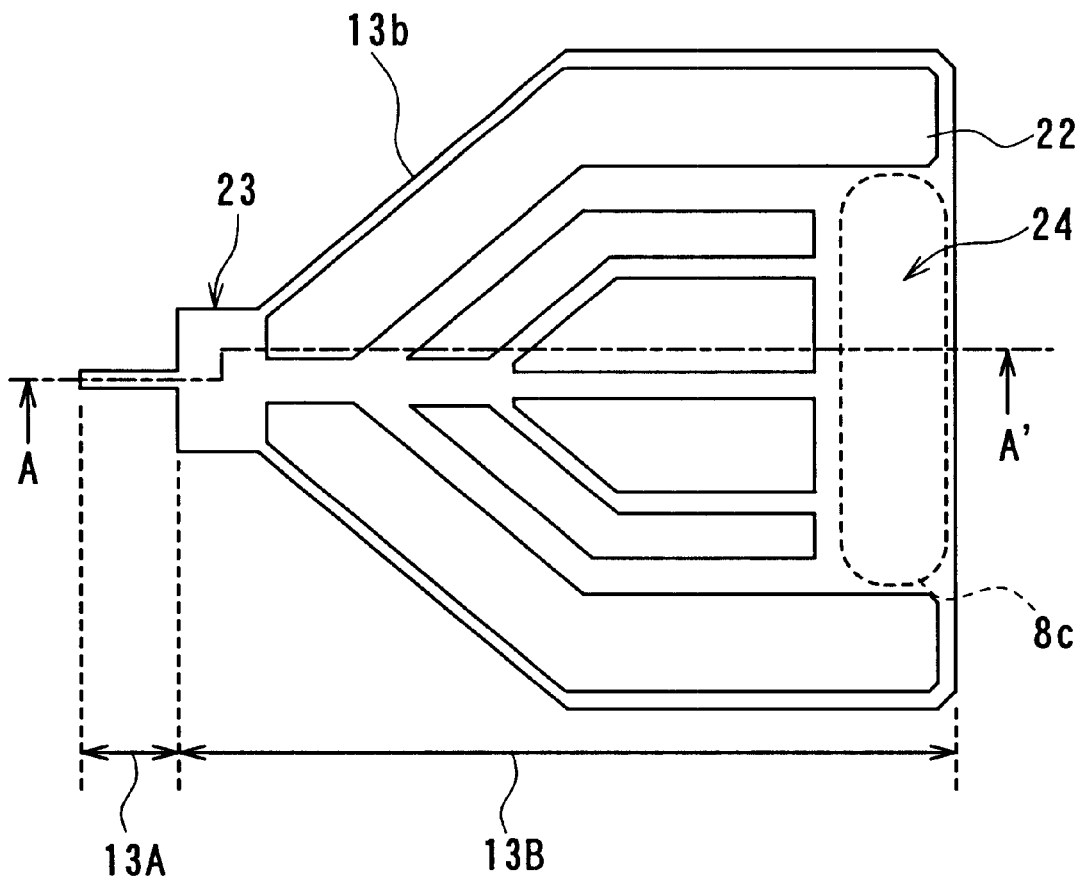
FIG. 9 is a top view of a second magnetic material layer and a second resistance layer of the top pole layer of the thin-film magnetic head of the first embodiment.

Next, on the recording gap layer 12, a top pole layer 13 is formed through the following steps. A first magnetic material layer 13a made of a magnetic material having a thickness of about 0.5 to 1.5 μm is formed into a specific pattern on the recording gap layer 12. Next, on the first magnetic material layer 13a, a first resistance layer 21 having a thickness of tens to hundreds of nanometers, for example, is formed into a specific pattern. The electric resistance of the first resistance layer 21 is greater than that of the first magnetic material layer 13a. FIG. 8 is a top view illustrating the first magnetic material layer 13a and the first resistance layer 21 of the top pole layer 13. Next, on the first resistance layer 21, a second magnetic material layer 13b having a thickness of about 0.5 to 1.5 μm, for example, is formed into a specific pattern. The second magnetic material layer 13b is made of the same magnetic material as the first magnetic material layer 13a. Next, on the second magnetic material layer 13b, a second resistance layer 22 having a thickness of tens to hundreds of nanometers, for example, is formed into the same pattern as the first magnetic material layer 13a. The electric resistance of the second resistance layer 22 is greater than that of the second magnetic material layer 13b. FIG. 9 is a top view illustrating the second magnetic material layer 13b and the second resistance layer 22 of the top pole layer 13. Next, on the second resistance layer 22, a third magnetic material layer 13c having a thickness of about 0.5 to 1.5 μm, for example, is formed into the same pattern as the first magnetic material layer 13a. The third magnetic material layer 13c is made of the same magnetic material as the first magnetic material layer 13a.

The magnetic material layers 13a to 13c may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

The resistance layers 21 and 22 may be made of alumina, aluminum nitride, a silicon-dioxide-base material, a silicon-nitride-base material, or diamond-like carbon (DLC) and so on. The resistance layers 21 and 22 may be formed into the specific patterns by forming films of the above-mentioned inorganic insulating material through sputtering and selectively etching the films through reactive ion etching (RIE), for example.

As thus described, the top pole layer 13 of this embodiment is made up of the plurality of stacked magnetic material layers 13a to 13c, and the resistance layers 21 and 22 each placed between neighboring two of the magnetic material layers. The features of the top pole layer 13 will be described in detail later.

Next, the recording gap layer 12 is selectively etched through dry etching, using the top pole layer 13 as a mask. Next, the second portion 8b of the bottom pole layer is selectively etched by about 0.3 to 0.6 μm through argon ion milling, for example. A trim structure as shown in FIG. 6B is thus formed. The trim structure suppresses an increase in the effective track width due to expansion of a magnetic flux generated during writing in a narrow track.

Figure 10:
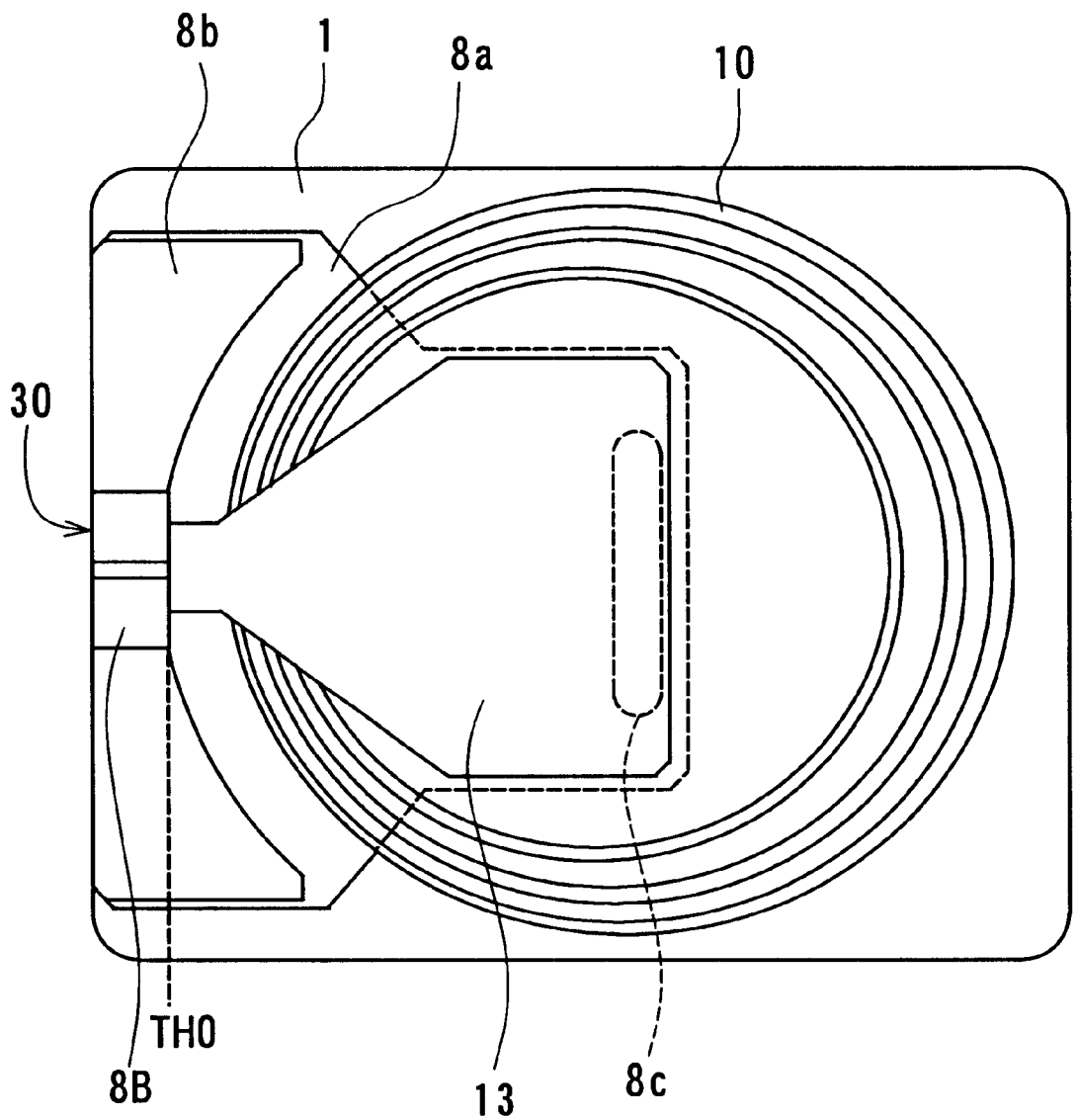
FIG. 10 is a top view of the thin-film magnetic head of the first embodiment.

Next, as shown in FIG. 7A and FIG. 7B, an overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider including the foregoing layers is performed to form the air bearing surfaces of the recording head and the reproducing head. The thin-film magnetic head of the embodiment is thus completed. FIG. 10 is a top view of the thin-film magnetic head of the embodiment. The overcoat layer 17 is omitted in FIG. 10. In FIG. 10 numeral 8B indicates a portion of the second portion 8b of the bottom pole layer etched to make the trim structure.

In this embodiment the bottom pole layer made up of the first portion 8a, the second portion 8b and the third portion 8c corresponds to a first magnetic layer of the invention. The top pole layer 13 made up of the magnetic material layers 13a to 13c and the resistance layers 21 and 22 corresponds to a second magnetic layer of the invention. The bottom shield layer 3 corresponds to a first shield layer of the invention. Since the bottom pole layer also functions as the top shield layer, the bottom pole layer corresponds to a second shield layer of the invention, too.

As described so far, the thin-film magnetic head of the embodiment comprises the reproducing head and the recording head. The reproducing head has: the MR element 5; and the bottom shield layer 3 and the top shield layer (bottom pole layer) for shielding the MR element 5. Portions of the bottom shield layer 3 and the top shield layer located on a side of the medium facing surface (air bearing surface) facing toward a recording medium are opposed to each other, the MR element 5 being placed between the portions.

The recording head has the bottom pole layer and the top pole layer 13 magnetically coupled to each other, each of which includes at least one layer. The bottom pole layer and the top pole layer 13 include pole portions opposed to each other and placed in regions on a side of the medium facing surface. The recording head further has: the recording gap layer 12 placed between the pole portion of the bottom pole layer and the pole portion of the top pole layer 13; and the thin-film coil 10 at least part of which is placed between the bottom pole layer and the top pole layer 13, the at least part of the coil 10 being insulated from the bottom pole layer and the top pole layer 13. Each of the bottom pole layer and the top pole layer 13 has the yoke portion coupled to the pole portion and located in a region including a region facing the coil 10.

In the embodiment the bottom pole layer has: the first portion 8a placed in a region including a region facing the coil 10; and the second portion 8b connected to a surface of the first portion 8a facing the coil 10. The second portion 8b forms the pole portion. The coil 10 is placed on a side of the second portion 8b.

The features of the top pole layer 13 of the embodiment will now be described. As shown in FIG. 7A, FIG. 7B, FIG. 8 and FIG. 9, the top pole layer 13 has the pole portion 13A and the yoke portion 13B coupled to the pole portion 13A and located in a region including a region facing the thin-film coil 10. As shown in FIG. 7A and FIG. 7B, the portion coupling the pole portion 13A to the yoke portion 13B is located in the zero throat height position or a neighborhood thereof. As shown in FIG. 8 and FIG. 9, the pole portion 13A has a specific narrow width. The width of the pole portion 13A defines the track width of the recording head. A portion 23 of the yoke portion 13B near the portion coupling the yoke portion 13B to the pole portion 13A has a specific width greater than that of the pole portion 13A. A portion of the yoke portion 13B farther from the air bearing surface than the portion 23 (that is, on the right side of FIG. 8 and FIG. 9) increases in width as the distance from the air bearing surface increases, and has a specific width from a specific point.

The top pole layer 13 is made up of the plurality of stacked magnetic material layers 13a to 13c, and the resistance layers 21 and 22 each placed between adjacent two of the magnetic material layers. As shown in FIG. 8 and FIG.

9, the resistance layers 21 and 22 are located in a region of the yoke portion 13B of the top pole layer 13 except the portion 23 around the portion coupling the yoke portion 13B to the pole portion 13A and except the portion 24 around the portion coupling the yoke portion 13B to the other magnetic layer, that is, the bottom pole layer.

The resistance layers 21 and 22 are each divided and located in a plurality of separate regions. In this embodiment, in particular, the resistance layers 21 and 22 are each stripe-shaped. As will be noted from a comparison between FIG. 8 and FIG. 9, the portions of the resistance layer 21 and the portions of the resistance layer 22 are nearly staggered. Alternatively, the portions of the resistance layer 21 and the portions of the resistance layer 22 may be located in the same places when seen from above.

FIG. 6A and FIG. 7A are cross sections taken along line A–A' of FIG. 8 and FIG. 9.

According to the embodiment, eddy current loss in the top pole layer 13 is reduced since the top pole layer 13 is made up of the plurality of stacked magnetic material layers 13a to 13c, and the resistance layers 21 and 22 each placed between adjacent two of the magnetic material layers.

In the yoke portion 13B of the top pole layer 13, a region through which a magnetic flux passes is originally narrow in the portion 23 around the portion coupling the yoke portion 13B to the pole portion 13A and in the portion 24 around the portion coupling the yoke portion 13B to the other magnetic layer, that is, the bottom pole layer, compared to the other portions of the yoke portion 13B. Therefore, if resistance layers are provided in the portions 23 and 24, the passage of a magnetic flux is prevented by the resistance layers. In this embodiment, in contrast, the resistance layers 21 and 22 are located in a region of the yoke portion 13B except the portions 23 and 24. As a result, eddy current loss is reduced without preventing the passage of the flux.

If the resistance layers are formed in the entire top pole layer, a region through which a flux passes is reduced and the passage of the flux is prevented. In this embodiment, in contrast, the resistance layers 21 and 22 are divided and located in a plurality of separate regions. As a result, the region through which a flux passes is increased, compared to the case in which the resistance layers are formed in the entire top pole layer. Eddy current loss in the top pole layer 13 is thereby reduced without preventing the passage of the flux.

According to the embodiment thus described, eddy current loss in the top pole layer 13 is reduced. High frequency characteristics of the thin-film magnetic head are thereby improved. For example, the nonlinear transition shift is reduced.

In the embodiment the thin-film coil 10 is placed on top of the first portion 8a and on the side of the second portion 8b of the bottom pole layer, and the top surface of the insulating layer 11 that covers the coil 10 is flattened. As a result, the top pole layer 13 is formed on the flat surface. Therefore, according to the embodiment, formation of the top pole layer 13 having the multilayer structure is facilitated. In addition, the dimensions of the pole portion 13A of the top pole layer 13 may be reduced to the half-micron order or quarter-micron order. The track width of the recording head is thereby reduced.

According to the embodiment, the throat height is not defined by the pole portion 13A of the top pole layer 13 that defines the track width of the recording head, but by the second portion 8b of the bottom pole layer. As a result, the throat height is uniformly defined with precision even if the track width is reduced.

According to the embodiment, both the thin-film coil 10 is formed on the flat surface. It is thereby possible to reduce the size of the coil 10. A reduction in yoke length of the recording head is thereby achieved.

According to the embodiment, as shown in FIG. 10, a portion of the top pole layer 13 (on the right side of FIG. 10) farther from the air bearing surface 30 than the zero throat height position or a neighborhood thereof has a specific width of 3 $\mu$m or greater, for example. A portion of the top pole layer 13 closer to the air bearing surface 30 than the zero throat height position or a neighborhood thereof has a specific width of the half-micron or quarter-micron order. As a result, a magnetic flux passing through the top pole layer 13 will not saturate in the portion farther from the air bearing surface 30 than the zero throat height position or a neighborhood thereof, but saturates in the portion closer to the air bearing surface 30 than the zero throat height position or a neighborhood thereof. It is thereby possible to improve nonlinear transition shift and the overwrite properties.

Figure 11:
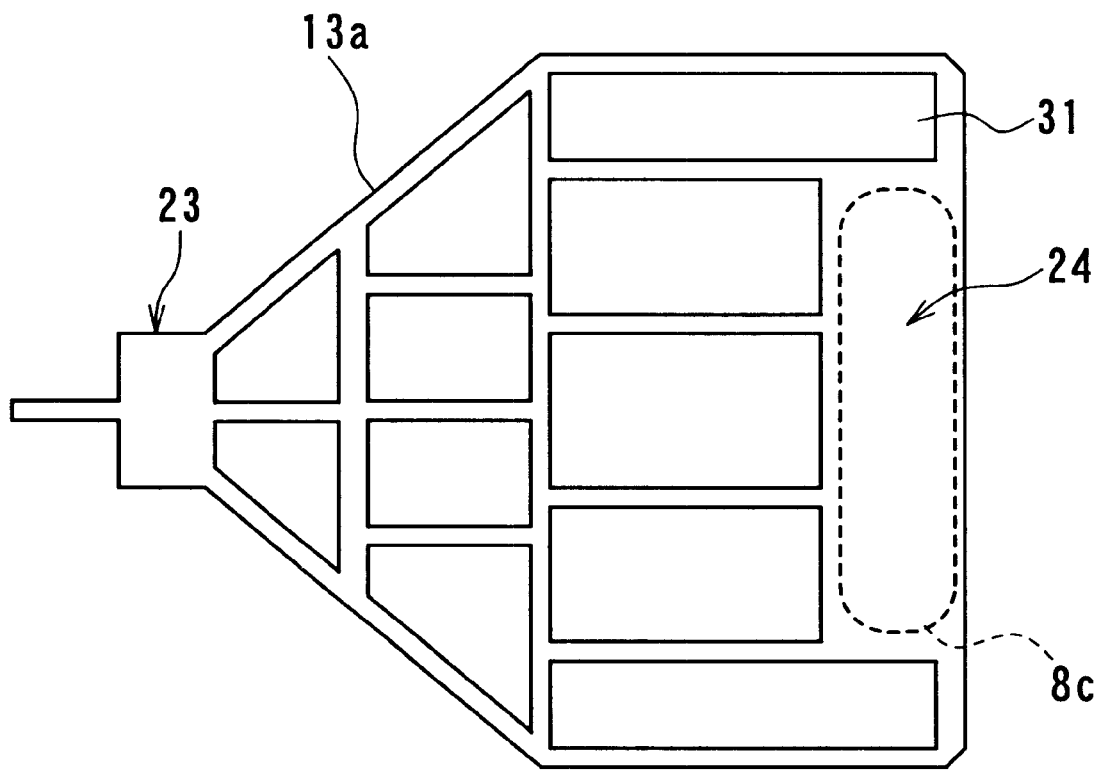
FIG. 11 is a top view of another example of the pattern of the resistance layer of the top pole layer of the thin-film magnetic head of the first embodiment.

FIG. 11 is a top view of another example of the pattern of the resistance layers of the top pole layer. In this example a resistance layer 31 is provided in place of the resistance layer 21 (FIG. 8). The resistance layer 31 is not stripe-shaped but divided and located in a plurality of insular separate regions. In this example a resistance layer having a pattern similar to that of the resistance layer 31 may be provided in place of the resistance layer 22 (FIG. 9). Alternatively, a resistance layer may be provided, the layer having portions nearly staggered with respect to the portions of the resistance layer 31.

Figure 12:
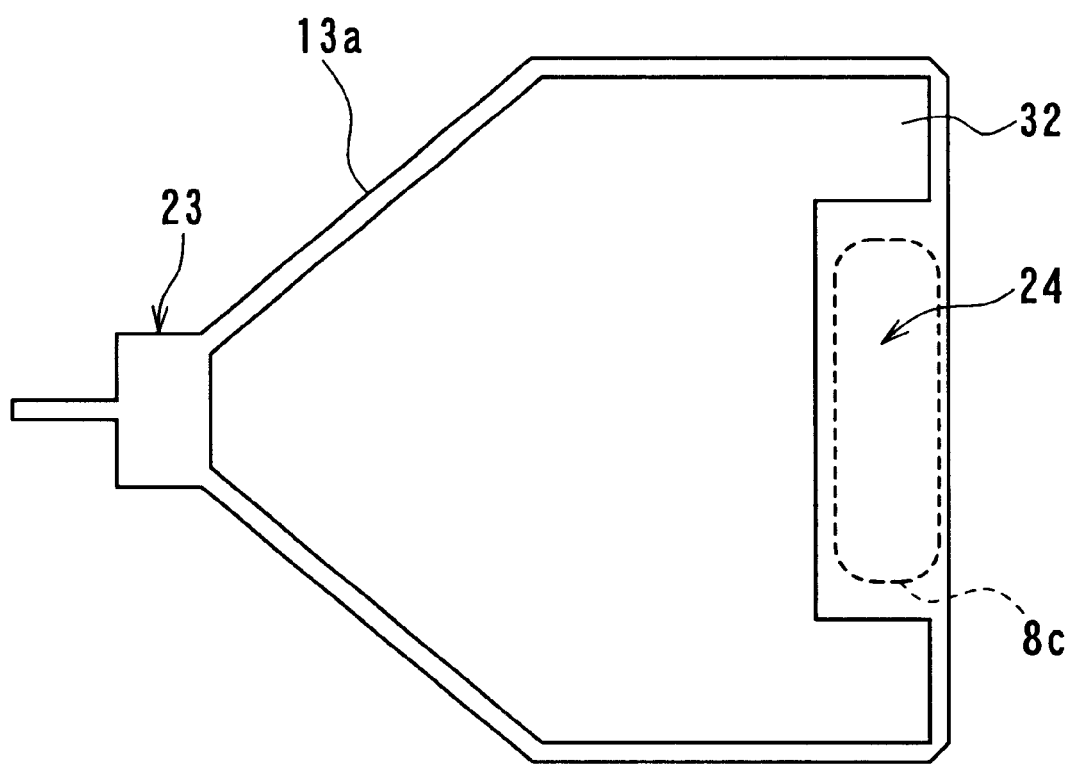
FIG. 12 is a top view of still another example of the pattern of the resistance layer of the top pole layer of the thin-film magnetic head of the first embodiment.

FIG. 12 is a top view of still another example of the pattern of the resistance layers of the top pole layer. In this example a resistance layer 32 is provided in place of the resistance layer 21 (FIG. 8). The resistance layer 32 is not divided and not located in a plurality of separate regions, but placed in the nearly entire region of the yoke portion 13B except the portion 23 around the portion coupling the yoke portion 13B to the pole portion 13A and the portion 24 around the portion coupling the yoke portion 13B to the other magnetic layer, that is, the bottom pole layer. In this example a resistance layer having a pattern similar to that of the resistance layer 32 may be provided in place of the resistance layer 22 (FIG. 9). Alternatively, a resistance layer having a pattern different from that of the resistance layer 32 may be provided.

Although the example shown in FIG. 12 does not have the effects that are produced when the resistance layer is divided and located in a plurality of separate regions, this example have the effects that are produced when the resistance layer is located in a region of the yoke portion 13B except the portion 23 around the portion coupling the yoke portion 13B to the pole portion 13A and the portion 24 around the portion coupling the yoke portion 13B to the other magnetic layer, that is, the bottom pole layer.

[Second Embodiment]

Figures 13A, 13B:
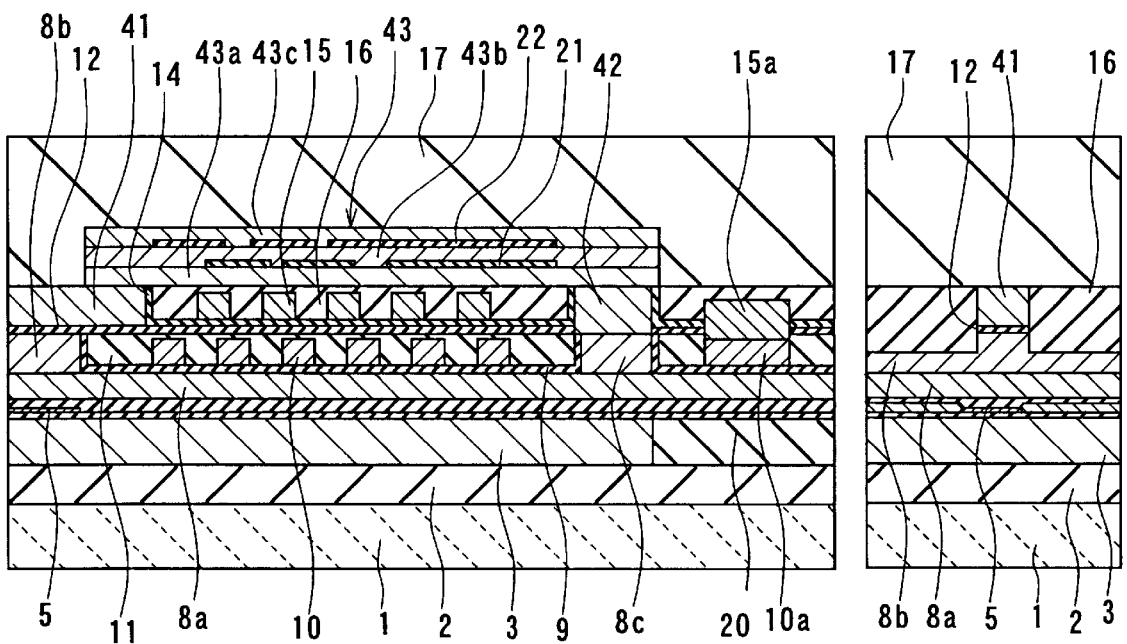
FIG. 13A and FIG. 13B are cross sections of a thin-film magnetic head of a second embodiment of the invention.
Figure 14:
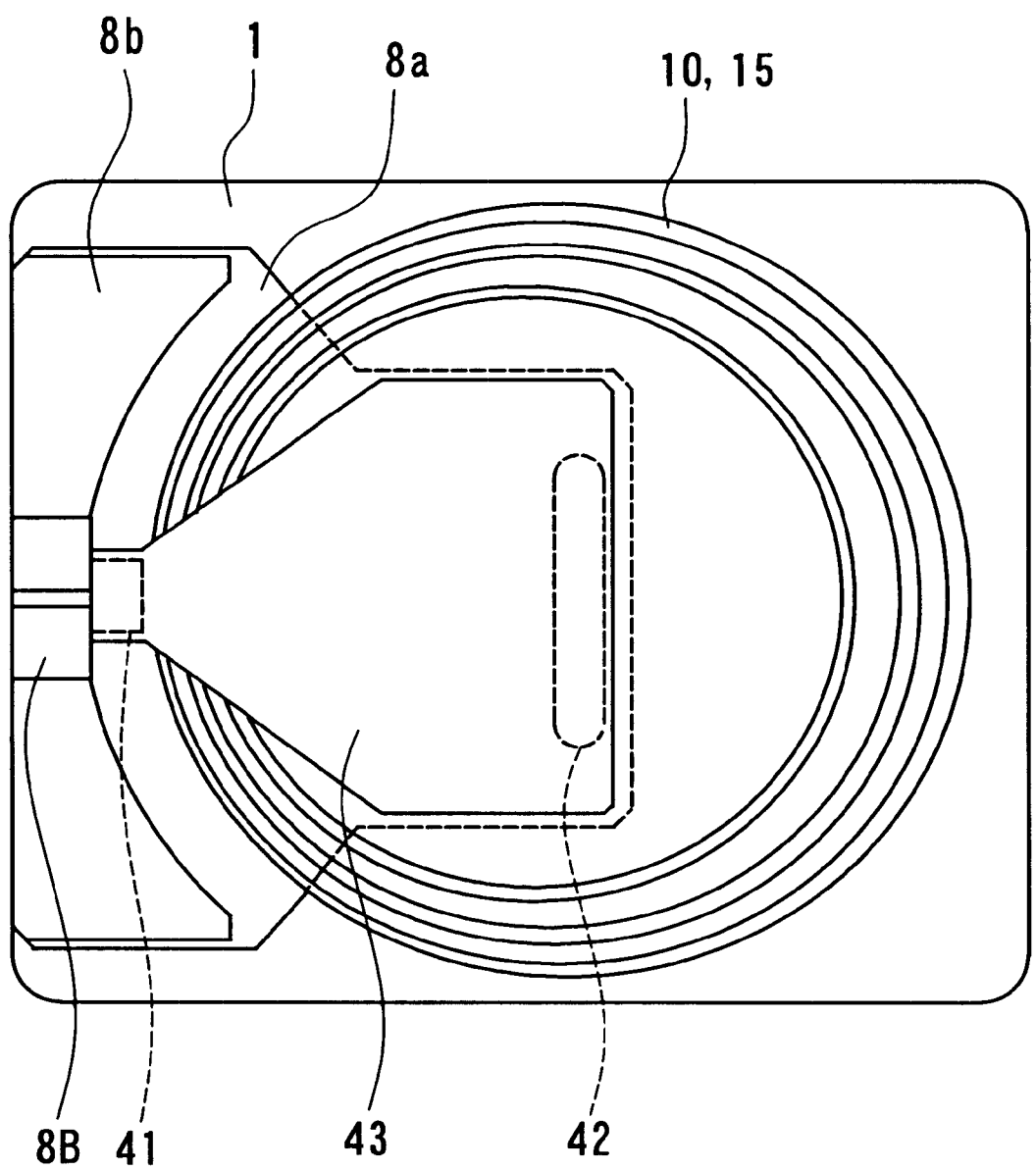
FIG. 14 is a top view of the thin-film magnetic head of the second embodiment.

Reference is now made to FIG. 13A, FIG. 13B and FIG. 14 to describe a thin-film magnetic head and a method of manufacturing the same of a second embodiment of the invention. FIG. 13A is a cross section orthogonal to an air bearing surface. FIG. 13B is a cross section parallel to the air bearing surface of a pole portion. FIG. 14 is a top view of the thin-film magnetic head in which an overcoat layer is omitted.

The thin-film magnetic head of the second embodiment is an example of a head having a two-layer thin-film coil. Numeral 10 indicates a first layer of the coil in this embodiment. The steps of the method of manufacturing the thin-film magnetic head of the second embodiment that are taken until the recording gap layer 12 is formed are similar to those of the first embodiment. In the following step of the second embodiment a pole portion layer 41 making up the pole portion of the top pole layer and having a thickness of 1.0 to 3.0 $\mu$m is formed on the recording gap layer 12. At the same time, a magnetic layer 42 having a thickness of 1.0 to 3.0 $\mu$m is formed in the contact hole provided in a portion on top of the third portion 8c of the bottom pole layer. The magnetic layer 42 is provided for connecting the bottom pole layer to a yoke portion layer of the top pole layer described later. The magnetic layer 42 is greater than the third portion 8c in size. The pole portion layer 41 of the top pole layer is equal to or greater than the second portion 8b of the bottom pole layer in this embodiment.

The pole portion layer 41 and the magnetic layer 42 of the top pole layer may be made of NiFe (80 weight % Ni and 20 weight % Fe), or NiFe (45 weight % Ni and 55 weight % Fe) as a high saturation flux density material through plating or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 41 as a mask. The dry etching may be reactive ion etching (RIE) using a chlorine-base gas such as $BCl_2$ or $Cl_2$, or a fluorine-base gas such as $CF_4$ or $SF_6$, for example. Next, the second portion 8b of the bottom pole layer is selectively etched by about 0.3 to 0.6 μm through argon ion milling, for example. A trim structure as shown in FIG. 13B is thus formed.

Next, an insulating film 14 of alumina, for example, is formed in a region where the coil is to be formed on the recording gap layer. The thickness of the insulating film 14 is about 0.3 to 0.6 μm.

Next, a second layer 15 of the thin-film coil made of copper (Cu), for example, is formed by frame plating. For example, the thickness of the second layer 15 is about 1.0 to 2.0 μm. Numeral 15a in the drawings indicates a portion to which the portion 10a of the first layer 10 of the coil is connected.

Next, an insulating layer 16 of alumina, for example, having a thickness of about 3 to 4 μm is formed over the entire surface. The insulating layer 16 is then polished through CMP, for example, until the pole portion layer 41 of the top pole layer and the magnetic layer 42 are exposed, and the surface is flattened.

On the pole portion layer 41, the magnetic layer 42 and the insulating layer 16 thus flattened, a yoke portion layer 43 making up a yoke portion of the top pole layer is formed. The yoke portion layer 43 is made up of a plurality of stacked magnetic material layers 43a to 43c, and the resistance layers 21 and 22 each placed between neighboring two of the magnetic layers. The method of forming the yoke portion layer 43 is similar to that of the top pole layer 13 of the first embodiment. The patterns of the resistance layers 21 and 22 are similar to those of the first embodiment, too.

According to the embodiment, an end face of the yoke portion layer 43 that faces toward a recording medium (toward the air bearing surface) is located at a distance (on the right side of FIG. 13A) from a surface of the thin-film magnetic head that faces toward the recording medium.

Next, the overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider is performed to form the air bearing surfaces of the recording head and the reproducing head. The thin-film magnetic head of the embodiment is thus completed.

In this embodiment the top pole layer made up of the pole portion layer 41, the magnetic layer 42 and the yoke portion layer 43 corresponds to the second magnetic layer of the invention.

According to the embodiment, the pole portion layer 41 of the top pole layer is formed on the flat surface. As a result, the dimensions of the pole portion layer 41 may be reduced to the half-micron order or quarter-micron order. The track width of the recording head is thereby reduced.

According to the embodiment, the second layer 15 of the thin-film coil is placed on the side of the pole portion layer 41 of the top pole layer. As a result, the yoke portion layer 43 of the top pole layer is formed on the flat surface. Formation of the yoke portion layer 43 having the multilayer structure is thereby facilitated. According to the embodiment, the yoke portion layer 43 is reduced in size, so that so called side write is prevented.

According to the embodiment, an end face of the yoke portion layer 43 that faces toward the air bearing surface is located at a distance from the air bearing surface of the thin-film magnetic head. Therefore, it is impossible that the yoke portion layer 43 is exposed from the air bearing surface even if the throat height is low. As a result, side write is prevented.

The remainder of the configuration, operations and effects of the embodiment are similar to those of the first embodiment.

[Third Embodiment]

Figure 15:
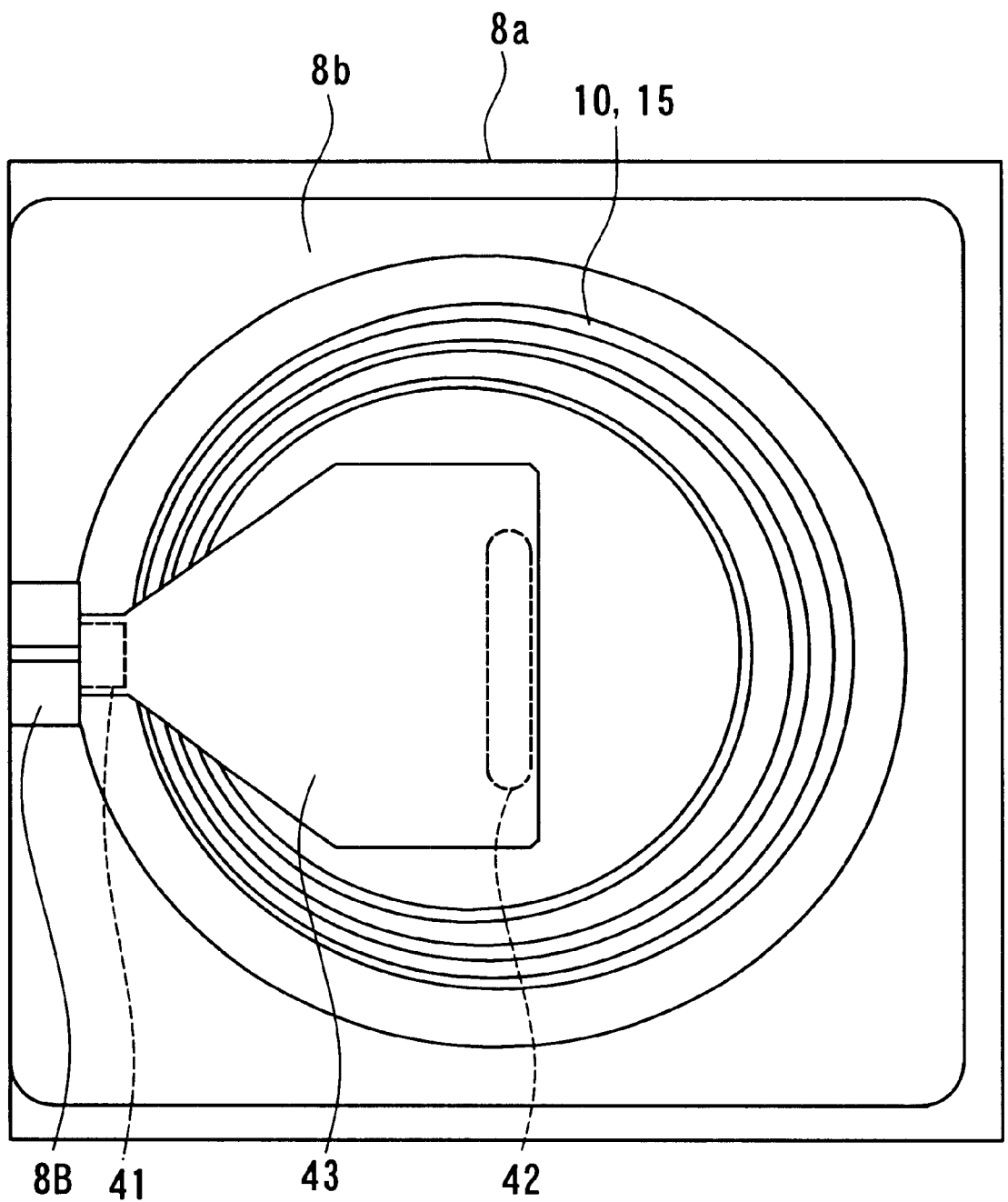
FIG. 15 is a top view of a thin-film magnetic head of a third embodiment of the invention.
Figures 20, 20B:
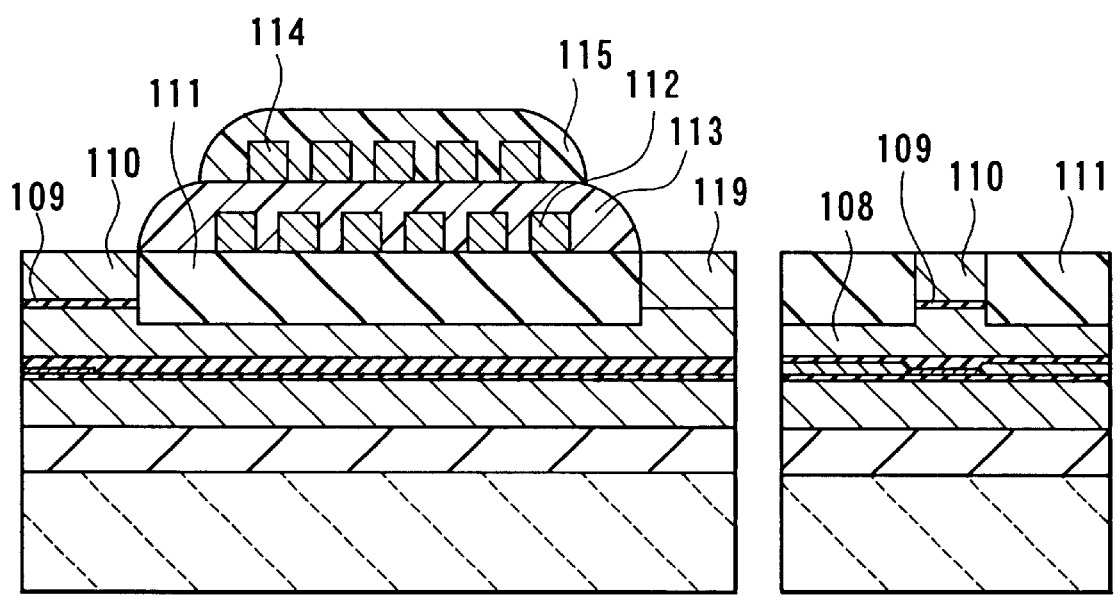
Figures 21A, 21B:
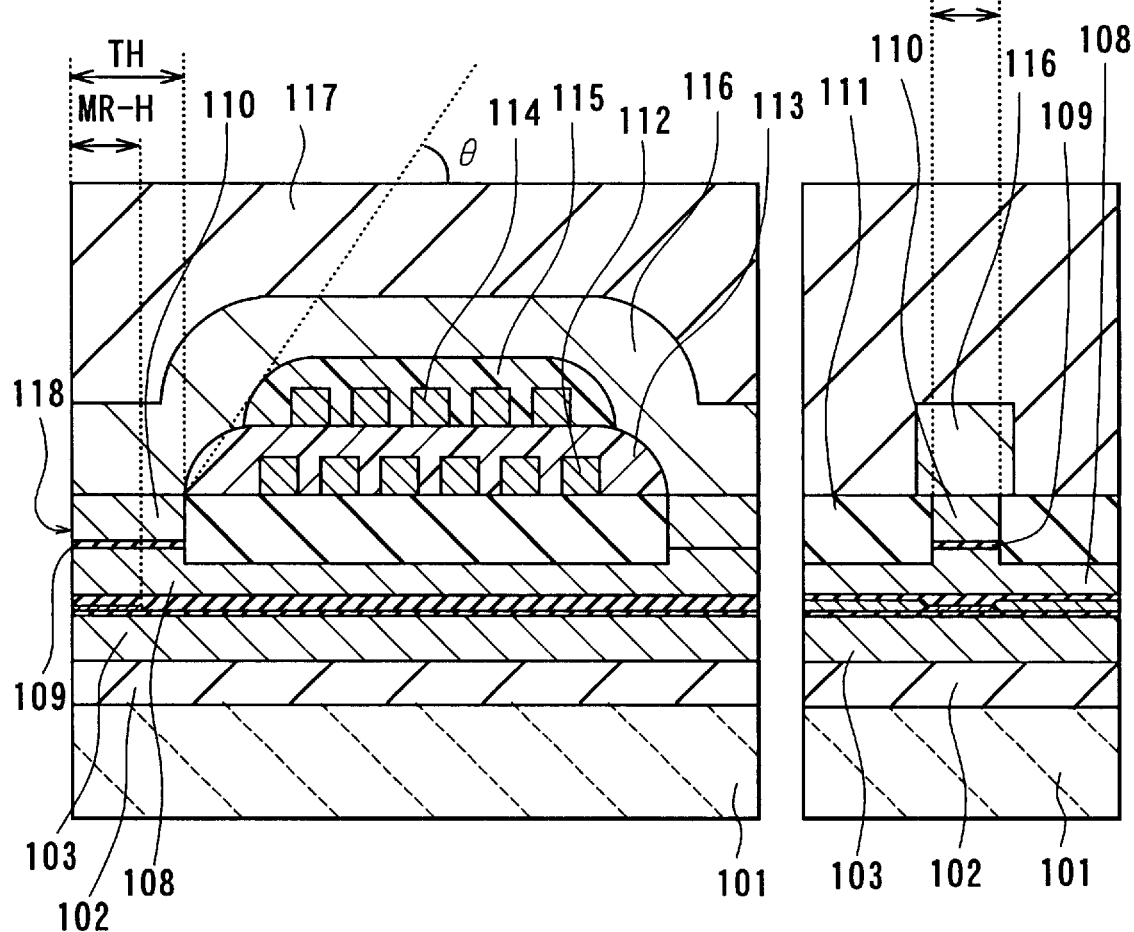
FIG. 21A and FIG. 21B are cross sections for illustrating a step that follows FIG. 20A and FIG. 20B.
Figure 22:
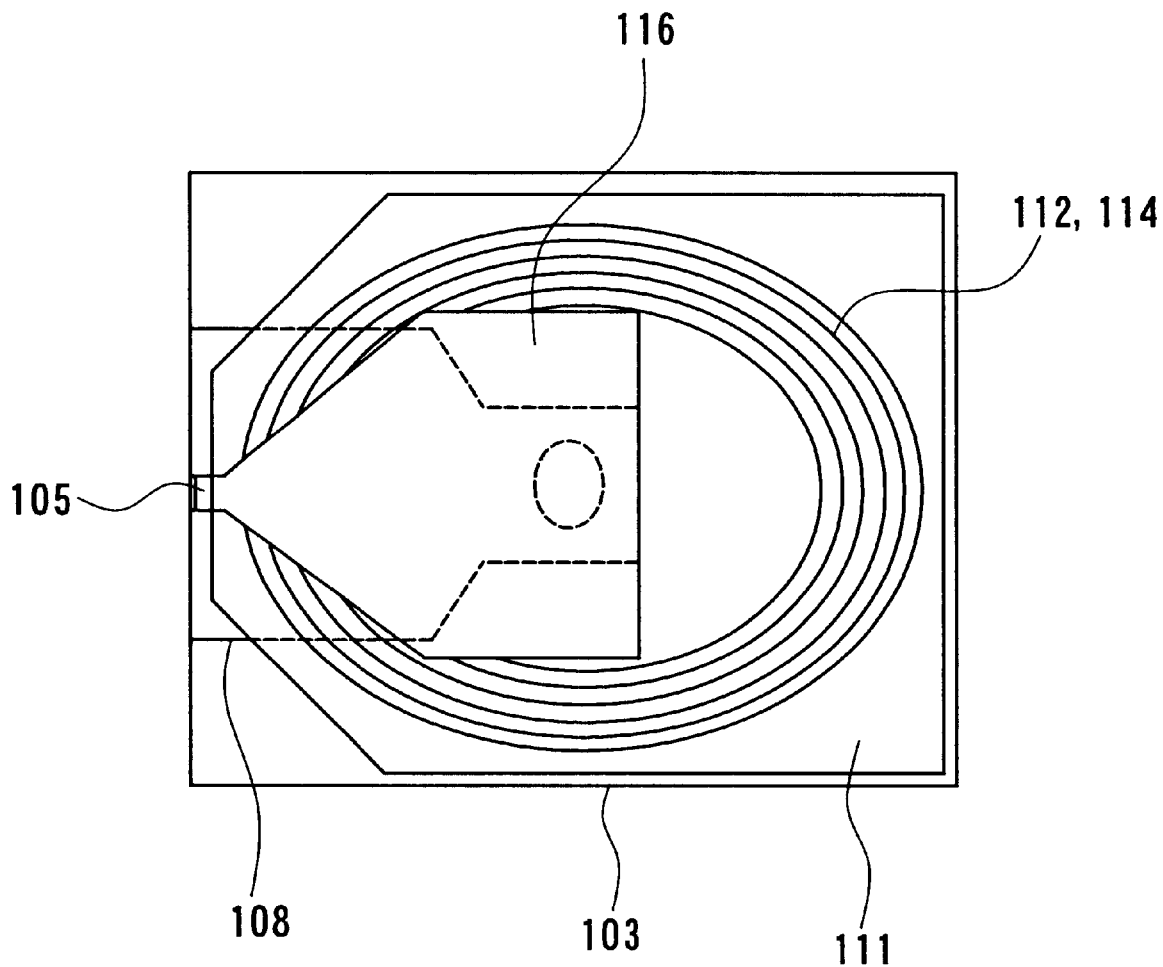
FIG. 22 is a top view of the related-art thin-film magnetic head.

Reference is now made to FIG. 15 to describe a thin-film magnetic head and a method of manufacturing the same of a third embodiment of the invention. FIG. 15 is a top view of the thin-film magnetic head in which an overcoat layer is omitted.

In the thin-film magnetic head of the third embodiment the second portion 8b of the bottom pole layer surrounds the first layer 10 of the thin-film coil. Such a shape of the second portion 8b facilitates the processing of flattening the insulating layer 11.

The remainder of the configuration, operations and effects of the third embodiment are similar to those of the second embodiment. The second portion 8b of the first embodiment may alternatively have a shape similar to that of the third embodiment.

The present invention is not limited to the foregoing embodiments but may be practiced in still other ways. For example, although only the yoke portion of the top pole layer has a configuration in which each of the resistance layers is inserted between a plurality of magnetic material layers in the foregoing embodiments, the yoke portion of the bottom pole layer may have a similar configuration.

Although the bottom pole layer defines the throat height in the foregoing embodiment, the top pole layer may define the throat height.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

According to the first thin-film magnetic head or the method of manufacturing the same of the invention described so far, the yoke portion of at least one of the magnetic layers includes the plurality of magnetic material layers and the resistance layer. The resistance layer is located in a region of the yoke portion except a neighborhood of the portion connecting the yoke portion to the pole portion and except a neighborhood of the portion connecting the yoke portion to the other magnetic layer. As a result, it is possible to reduce eddy current loss in the magnetic layers making up the magnetic path of the induction-type magnetic transducer without preventing the passage of a magnetic flux so as to improve high frequency characteristics.

According to the first thin-film magnetic head or the method of manufacturing the same of the invention, the resistance layers may be divided and located in a plurality of separate regions. In this case, the region through which a magnetic flux passes is increased, and eddy current loss in the magnetic layers is further reduced.

According to the first thin-film magnetic head or the method of manufacturing the same of the invention, the first magnetic layer may include: the first portion located in a region including a region that faces the thin-film coil; and the second portion forming the pole portion and connected to a surface of the first portion facing the coil. At least part of the coil is placed on a side of the second portion of the first magnetic layer. The yoke portion of the second magnetic layer includes the plurality of magnetic material layers and the resistance layer. In this case, it is easy to form the yoke portion of the second magnetic layer having the multilayer structure.

According to the second thin-film magnetic head or the method of manufacturing the same of the invention described so far, the yoke portion of at least one of the magnetic layers includes the plurality of magnetic material layers and the resistance layer. The resistance layer is divided and located in a plurality of separate regions. As a result, it is possible to reduce eddy current loss in the magnetic layers making up the magnetic path of the induction-type magnetic transducer without preventing the passage of a magnetic flux so as to improve high frequency characteristics.

According to the second thin-film magnetic head or the method of manufacturing the same of the invention, the first magnetic layer may include: the first portion located in a region including a region that faces the thin-film coil; and the second portion forming the pole portion and connected to a surface of the first portion facing the coil. At least part of the coil is placed on a side of the second portion of the first magnetic layer. The yoke portion of the second magnetic layer includes the plurality of magnetic material layers and the resistance layer. In this case, it is easy to form the yoke portion of the second magnetic layer having the multilayer structure.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:

a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer;

a gap layer provided between the pole portions of the first and second magnetic layers; and a thin-film coil at least part of which is placed between the first and second magnetic layers, the at least part of the coil being insulated from the first and second magnetic layers; wherein:

each of the first and second magnetic layers includes: a yoke portion connected to one of the pole portions and located in a region including a region that faces the coil;

the yoke portion of at least one of the magnetic layers includes: a plurality of magnetic material layers; and a resistance layer located between adjacent two of the magnetic material layers and having an electric resistance greater than an electric resistance of the magnetic material layers; and the resistance layer is divided and located in a plurality of regions that are separated from each other so as to be arranged in a direction parallel to the medium facing surface.

2. The thin-film magnetic head according to claim 1, wherein the resistance layer is located in a region of the yoke portion except a neighborhood of a portion connecting the yoke portion to one of the pole portions and except a neighborhood of a portion connecting the yoke portion to the other magnetic layer.

3. The thin-film magnetic head according to claim 1, wherein the resistance layer is made of an insulating material.

4. The thin-film magnetic head according to claim 3, wherein the insulating material is an inorganic material.

5. The thin-film magnetic head according to claim 1, wherein:

the first magnetic layer includes: a first portion located in a region including the region that faces the coil; and a second portion forming one of the pole portions and connected to a surface of the first portion that faces the coil;

the at least part of the coil is located on a side of the second portion of the first magnetic layer; and the yoke portion of the second magnetic layer includes the magnetic material layers and the resistance layer.

6. The thin-film magnetic head according to claim 1, further comprising: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

7. The thin-film magnetic head according to claim 6, wherein the second shield layer functions as the first magnetic layer, too.

8. The thin-film magnetic head according to claim 1, wherein the resistance layer has a plurality of portions each extending in a direction orthogonal to the medium facing surface, and is stripe-shaped.

9. The thin-film magnetic head according to claim 1, wherein: the yoke portion of at least one of the magnetic layers includes two of the resistance layers that are adjacent to each other with one of the magnetic material layers interposed in between; each of the resistance layers has a plurality of portions each extending in a direction orthogonal to the medium facing surface, and is stripe-shaped; and the portions of one of the resistance layers and the portions of the other of the resistance layers are nearly staggered.

10. The thin-film magnetic head according to claim 1, wherein the resistance layer has a plurality of portions located in a plurality of regions that are separated from each other in directions parallel and orthogonal to the medium facing surface.

11. The thin-film magnetic head according to claim 1, wherein: the yoke portion of at least one of the magnetic layers includes two of the resistance layers that are adjacent to each other with one of the magnetic material layers interposed in between; each of the resistance layers has a plurality of portions located in a plurality of regions that are separated from each other in directions parallel and orthogonal to the medium facing surface; and the portions of one of the resistance layers and the portions of the other of the resistance layers are nearly staggered.

12. A method of manufacturing a thin-film magnetic head comprising:

a first magnetic layer and a second magnetic layer magnetically coupled to each other and including magnetic pole portions opposed to each other and placed in regions of the magnetic layers on a side of a medium facing surface of the head that faces toward a recording medium, each of the magnetic layers including at least one layer;

a gap layer provided between the pole portions of the first and second magnetic layers; and a thin-film coil at least part of which is placed between the first and second magnetic layers, the at least part of the coil being insulated from the first and second magnetic layers; wherein:

each of the first and second magnetic layers includes: a yoke portion connected to one of the pole portions and located in a region including a region that faces the coil; the method including the steps of:

forming the first magnetic layer;

forming the gap layer on the first magnetic layer;

forming the second magnetic layer on the gap layer; and forming the coil such that the at least part of the coil is placed between the first and second magnetic layers; wherein:

in at least one of the steps of forming the first magnetic layer and forming the second magnetic layer, the yoke portion is formed to include: a plurality of magnetic material layers; and a resistance layer located between adjacent two of the magnetic material layers and having an electric resistance greater than an electric resistance of the magnetic material layers; and the resistance layer is divided and located in a plurality of regions that are separated from each other so as to be arranged in a direction parallel to the medium facing surface.

13. The method according to claim 12, wherein the resistance layer is located in a region of the yoke portion except a neighborhood of a portion connecting the yoke portion to one of the pole portions and except a neighborhood of a portion connecting the yoke portion to the other magnetic layer in at least one of the steps of forming the first magnetic layer and forming the second magnetic layer.

14. The method according to claim 12, wherein the resistance layer is made of an insulating material.

15. The method according to claim 14, wherein the insulating material is an inorganic material.

16. The method according to claim 15, wherein the resistance layer is formed into a specific pattern by selectively etching a layer of the inorganic material through reactive ion etching.

17. The method according to claim 12, wherein:

in the step of forming the first magnetic layer, the first magnetic layer is formed to include: a first portion located in a region including the region that faces the coil; and a second portion forming one of the pole portions and connected to a surface of the first portion that faces the coil;

in the step of forming the coil, the at least part of the coil is located on a side of the second portion of the first magnetic layer; and in the step of forming the second magnetic layer, the yoke portion of the second magnetic layer is formed to include the magnetic material layers and the resistance layer.

18. The method according to claim 12, further including the step of forming: a magnetoresistive element; and a first shield layer and a second shield layer for shielding the magnetoresistive element, portions of the first and second shield layers located in regions on a side of the medium facing surface being opposed to each other, the magnetoresistive element being placed between the portions of the shield layers.

19. The method according to claim 18, wherein the second shield layer is formed to function as the first magnetic layer, too.

20. The method according to claim 12, wherein the resistance layer has a plurality of portions each extending in a direction orthogonal to the medium facing surface, and is stripe-shaped.

21. The method according to claim 12, wherein: the yoke portion of at least one of the magnetic layers includes two of the resistance layers that are adjacent to each other with one of the magnetic material layers interposed in between; each of the resistance layers has a plurality of portions each extending in a direction orthogonal to the medium facing surface, and is stripe-shaped; and the portions of one of the resistance layers and the portions of the other of the resistance layers are nearly staggered.

22. The method according to claim 12, wherein the resistance layer has a plurality of portions located in a plurality of regions that are separated from each other in directions parallel and orthogonal to the medium facing surface.

23. The method according to claim 12, wherein: the yoke portion of at least one of the magnetic layers includes two of the resistance layers that are adjacent to each other with one of the magnetic material layers interposed in between; each of the resistance layers has a plurality of portions located in a plurality of regions that are separated from each other in directions parallel and orthogonal to the medium facing surface; and the portions of one of the resistance layers and the portions of the other of the resistance layers are nearly staggered.

* * * * *